Jan. 25, 1966     E. W. WISWALD     3,230,657
FISH LURE
Filed May 1, 1963
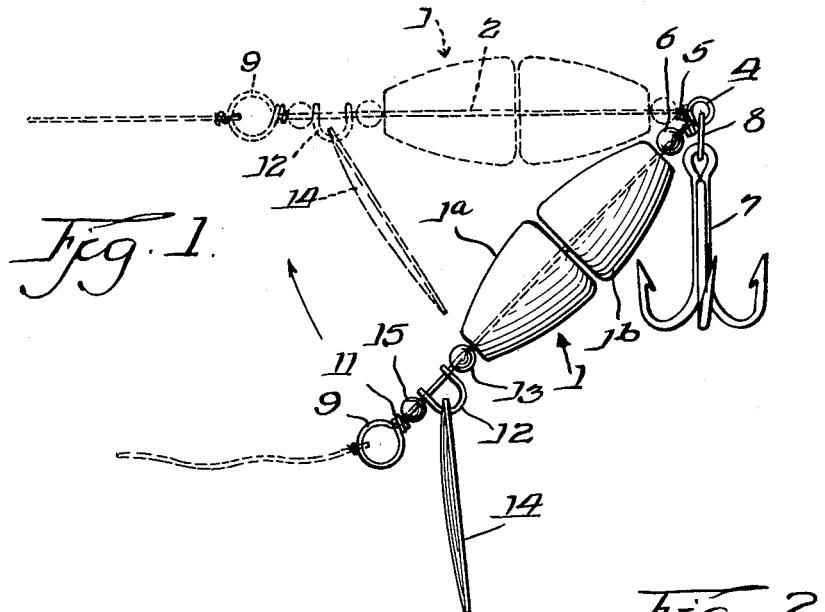
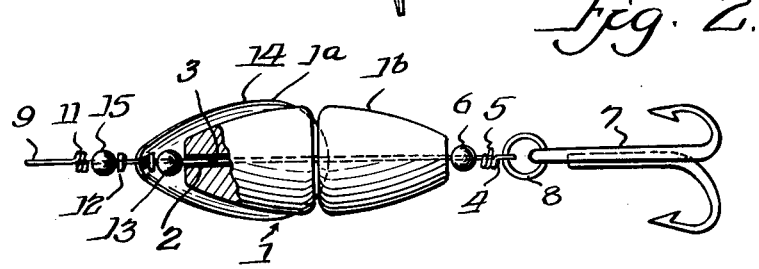
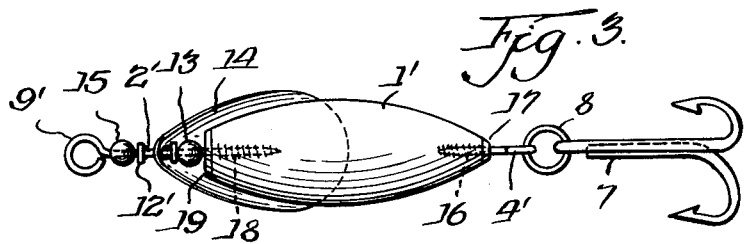
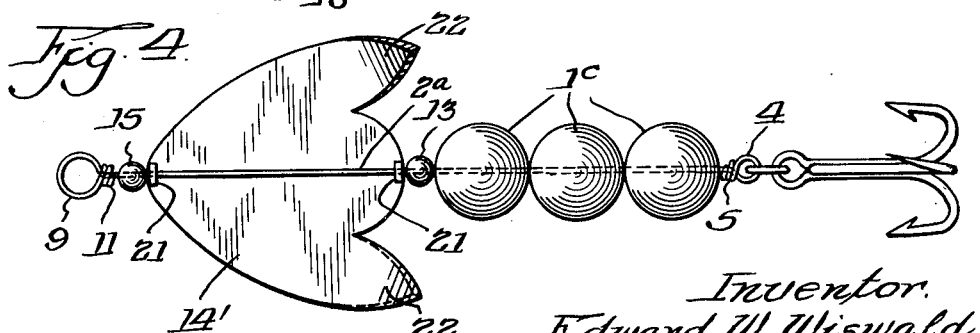
Inventor.
Edward W. Wiswald
By Nice & Nice Attys.

United States Patent Office 3,230,657
Patented Jan. 25, 1966

3,230,657
FISH LURE
Edward W. Wiswald, 1527 N. Meadowbrook Drive,
Round Lake, Ill.
Filed May 1, 1963, Ser. No. 277,177
6 Claims. (Cl. 43—42.17)

My invention relates generally to fish lures and more particularly to a fish lure structure having improved operational characteristics.

Successful fishing, of course, involves numerous factors, of which the essential and primary controlling factor is the necessity of placing the bait where the fish are located and unless this requirement is met, the other factors with respect to type of bait, time of day, weather conditions, etc., become immaterial. However, as is well known, the water depth plays an important part along with the area or location which is fished and it therefore often would be particularly advantageous to the fisherman if he can reasonably control the depth at which his bait will be moving as it is retrieved. Obviously, if such bait is passing too far above or too far below the general location of the fish being sought, the catch will be correspondingly reduced.

Likewise, the nature of the lake bottom, and in particular the vegetation, may control the type of lure employed and thus also the extent of the catch. For example, an area may be loaded with fish but the weeds and other growth extend to within a foot or two below the surface of the water and even though it might be considered that a spinner would be the most desirable bait insofar as the fish are concerned, such type of lure would run too deep and would result only in continuous snagging on the weeds. Obviously, if the depth at which the lure would travel through the water was readily adjustable, so that the desired type of lure could be employed but operable with the desired characteristics, the fisherman would be in a position to select the desired bait for the fish involved rather than the surroundings.

The present invention has among its objects the production of a fish lure which is so constructed that it will have controllable and predictable results in the water to enable the user to fish with the bait consistently disposed at or within a reasonable desired operating depth, without requiring an adjustment of the lure structure.

A further object of the invention is the production of such a fish lure which is relatively simple in construction, having a minimum of parts, inexpensive to manufacture and which will present an attractive appearance as well as provide controllable retrieving characteristics.

Many other objects and advantages of the construction herein shown and described will be obvious to those skilled in the art from the disclosure herein given.

In the drawings, wherein like reference characters indicate like or corresponding parts:

FIG. 1 is a side elevational view of a fish lure embodying the invention, illustrating the relative positions of the various portions of the lure when at rest in the water, and illustrating in dotted lines the approximate initial movement of the lure when the line is subsequently tensioned;

FIG. 2 is a top plan view of the lure illustrated in FIG. 1;

FIG. 3 is a top plan view similar to FIG. 2 of a lure embodying a modified form of body structure; and FIG. 4 is a top plan view of another modified lure body structure.

The present invention contemplates the production of a fish lure which is constructed in the form of a plurality of sections, the body section being constructed of buoyant material and having at its trailing end a hook structure such as a treble hook, and having a non-buoyant section adjacent the leading end of the body section, which non-buoyant section may be in the form of a spoon or other spinner structure with or without additional non-buoyant elements such as a weight member or the like. The construction is such that the buoyant section has considerably greater buoyancy than the hook disposed at the trailing end thereof, but less buoyancy than the weight of the non-buoyant portions of the lure, whereby the latter will sink in the water, the ratio of the buoyancy to the weight of the non-buoyant portions preferably being such that the lure will have a comparatively slow descent in the water, as for example, approximately one foot per second and will travel through the water, in the absence of other forces, at a depth which is substantially uniform, dependent upon the depth at which the retrieving was initiated.

The construction preferably is such that, when at rest in the water, the buoyant body section of the lure will be disposed approximately at an angle of forty-five degrees, the leading end being disposed at the bottom as a result of the comparatively heavy weight of the non-buoyant section such as a spinner, while the trailing end of the body section is elevated, thereby elevating the hook disposed at such body end. It will be appreciated that as the hook is elevated, and is in effect shielded by the body portion, it will tend to ride over obstacles, and in the event that the lure becomes partially snagged at the front end, whereby the retrieving movement of the lure through the water is halted, the buoyancy of the body section will immediately raise the hook above the point of snag and the lure will then normally ride over the particular obstacle as the spinner or other leading element normally will not hang up on the obstacle but eventually pull off of or over the same. Thus, in most cases, the lure will be relatively weedless and snag-proof, even though the hook may be of an otherwise unguarded type.

Referring to the drawings and more particularly to FIGS. 1 and 2, the lure therein disclosed comprises a body section indicated generally by the reference numeral 1, illustrated as being formed in two sections 1a and 1b which are supported on a wire member 2 which extends through bores 3 in the portions 1a and 1b, the trailing end of the wire member terminating in an eye 4 formed by reversely bending the wire and twisting it back upon itself as indicated at 5, with a suitable bead 6 or other member, if desired, being interposed between the portion 5 of the wire and the adjacent end of the body 1b. Operatively connected to the adjacent end of the wire member 2 is a treble hook 7, illustrated as being operatively connected to the wire member 2 by a ring 8 passing through the eye of the hook and the eye 4.

The opposite end of the wire member 2 is likewise provided with an eye 9 with the free end of the wire member being wrapped around the adjacent portion as indicated at 11. The wire 2 also carries a bail 12 which is disposed adjacent the leading end of the body portion 1a, a bead 13 preferably being interposed between the bail 12 and the adjacent end of the body portion 1a. Mounted on the bail is a spinner 14 which, as illustrated, may be of the spoon type, a small bead 15, if desired, being disposed between the bail 12 and the adjacent end of the wire member 2.

The weight of the lure will vary with the size thereof and in particular whether designed for bait casting, spin casting, etc., the size of the body and its material, whether of wood, plastic or the like, being carefully selected to provide the desired characteristics. Thus, the body 1 is of a size and constructed of a material which in the final form will provide a degree of buoyancy in the body portion which is more than adequate to support the weight of the hook 7. At the same time, the buoyancy of the body is less than the total weight of the lure, whereby the latter will sink in the water, the relationship between the lure weight and the buoyancy of the body portion 1 preferably being proportioned to give a comparatively slow sinking action of approximately one foot per second. At the same time the buoyancy of the body portion will normally tend to offset the weight of the hook 7 and thereby elevate the latter with respect to the leading portion of the lure carrying the spoon 14 and the lure will thus settle to the bottom and remain at rest in approximately the position illustrated in solid lines in FIG. 1. While FIG. 1 illustrates the body of the lure as extending approximately at a forty-five degree angle, such angle will vary and may be greater or less than that illustrated, depending upon the particular design.

In operation, the user may readily determine the depth at which the lure is to be retrieved, and it is readily possible to consistently retrieve the lure at substantially a constant depth. Assuming the lure will sink at approximately one foot per second, the user, following casting out of the lure, merely starts counting from the time the lure hits the water, timing the count to approximately one per second and each count will therefore approximate one foot of depth. Thus, if it is desired to fish at a four foot level, the user merely counts to four and starts to retrieve the lure. The user may retrieve in any suitable fashion, generally in accordance with normal fishing techniques, as for example, relatively slow, fast, jerky or with a jigging motion, without loss of action on the part of the lure or tendency to materially alter its direction of travel. Obviously, assuming that the lure was retrieved at an excessively high rate of speed, to-wit, higher than that normally employed, and particularly if the lure is being retrieved from a relatively considerable depth, whereby the tensioned line was inclined from the horizontal, the lure may tend to rise in the water to follow the angle of the tensioned line, but under normal conditions the lure will tend to travel at substantially a constant depth.

It will be appreciated that a lure having these features presents considerable advantages over the average lure, enabling the user to vary the fishing depth and to readily fish above weeds and the like. Likewise, the action of the lure enables the user to determine the depth of the water at the point the lure hits the water. For example, the lure may be cast out and permitted to sink to various depths on successive casts and assuming that the presence of weeds are noted, for example, at four feet below the surface, on the next cast the lure may be permitted to sink to only three feet and retrieved at such depth, thereby permitting unimpeded action and at the same time bringing the lure to a desired depth with respect to the weeds.

It will also be noted that the construction provides a very high degree of weedless action without the use of weedless type hooks and the like, this result being achieved by the fact that the body portion will normally maintain the hook 7 in an elevated position with respect to the leading end of the lure except when the line is under tension as the lure is retrieved.

The body portion thus acts as a very effective guard for the hook, either when the lure is permitted to settle to the bottom or when the lure strikes an obstacle.

For example, assuming the lure is permitted to settle to the bottom, upon reaching such bottom the lure will assume a position similar to that illustrated in FIG. 1, whereby the hook 7 remains elevated above the bottom, and when the line is tensioned, the body portion will tend to pivot about its connection with the ring 8 and the hook 7 until the axis of the body portion is more or less aligned with the fish line, the latter being illustrated in dotted lines. Consequently when fishing along the bottom the lure tends to travel above such bottom and eliminating the possibility of the hook 7 becoming snagged on objects resting on such bottom surface. Likewise, a similar action will take place when the lure is retrieved, in the event the lure strikes an object or becomes temporarily snagged, as upon the halting of movement of the lure through the water, the buoyancy of the body portion will immediately tend to elevate the hook to a position similar to that illustrated in FIG. 1, in most cases thereby elevating the hook above the object on which the lure has snagged, and upon a slight jigging (intermittent tensioning of the line) the front end and spinner will tend to detach itself from the snagging object and pivot to a position similar to that illustrated in dotted lines in FIG. 1, permitting the lure to pass over the object. This action of the lure provides a degree of weedlessness to a considerable and far greater degree than would appear from a mere inspection of the lure or drawings thereof and literally must be used to be appreciated.

It will also be apparent to the skilled fisherman that the characteristics of the lure, particularly with respect to the manner in which it sinks, etc., enables the user to obtain a wide variety of actions and movements with the lure, not only in the horizontal plane but also in a vertical plane. Consequently the action obtainable from the lure is considerably more variable than can be achieved with previous lures.

FIGS. 3 and 4 illustrate other embodiments of the invention to indicate some of the many possibilities of lure configurations to which the invention is applicable.

Thus, in FIG. 3, a single body member 1' is employed, and in this embodiment the ring 8 connecting the hook 7 to the body passes through an eye 4' which may be constructed similar to a screw eye having a threaded shank 16 which is screwed into the body 1', such screw eye, if desired, carrying a small disk-like base portion 17.

In like manner the spinner 14 may be mounted on a screw eye indicated generally by the numeral 2' which is provided with a threaded end 18 engaged with the body 1', a suitable disk or washer 19, if desired, being disposed adjacent the body 1', the opposite end of the member 2' being provided with an eye 9' to which the line may be attached. The spinner 14 may be connected to the member 2' by a suitable bail member 12', disposed between beads 13 and 15.

FIG. 4 illustrates the application of the invention to a lure employing a rotating or propeller type spinner, and having three spherical shaped body sections 1c mounted on a wire member 2a in a manner similar to the body 1 of FIGS. 1 and 2. The opposite ends of the wire member 2 are provided with corresponding eyes 4 and 9, the respective free ends of the wire member being twisted as indicated at 5 and 11.

Disposed upon the wire element 2a, between the leading body member 1c and the eye 9, is a rotatable propeller type spinner 14' which may be suitably constructed with outwardly extending flanges or ears 21, having apertures therein through which the wire member 2a extends, thereby supporting the spinner 14' for free rotation about the axis of the wire member. The spinner 14' may be provided with a pair of blade portions 22 which are curved in opposite directions, as for example, the upper blade as viewed in FIG. 4 being bent upwardly or outwardly toward the viewer, and the lower blade being bent downwardly or inwardly away from the viewer, whereby water pressure on the blades 22, as the lure is moved through the water, will result in rotation of the spinner about the axis of the wire member 2.

As in the construction illustrated in FIGS. 1 to 3, the components of the lure illustrated in FIG. 4 are so selected as to size, shape, weight and buoyancy that the desired balance will be achieved in the assembly to provide the desired operational characteristics heretofore described.

It will also be noted that the novel construction of the lure enables the user to fish very shallow waters that could not be fished with the usual type lures, other than surface baits, as they would sink too fast, snag on the bottom, and thus provide poor retrieving characteristics. Likewise, as the lure sinks with the lure axis at an angle to the horizontal, an effective spinner action will be produced even while the lure is sinking, resulting in continuous fish-attracting action from the time the lure hits the water.

It will be appreciated from the above disclosure that I have provided a novel fish lure of exceedingly simple construction which is so designed that the user can readily control the action of the lure as to running depth and which is to a considerable extent weedless in action, permitting the lure to sink to the bottom of a body of water without danger of snagging and with relatively snag-proof action with respect to obstacles, weeds and the like. The invention also enables the production of such a lure structure which is designed to have a relatively slow sinking rate, enabling the user to readily and consistently fish at a predetermined desired depth, even in very shallow waters, and providing continuous lure action, even while the line is sinking.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. A fish lure including a buoyant body section, a non-buoyant section disposed adjacent the leading end of said buoyant body section, a spinner positioned contiguous to the leading end of the non-buoyant section and rotatable with respect to the longitudinal axis of the buoyant body section, said spinner including a portion of the weight of the non-buoyant section, a hook structure disposed at the trailing end of said buoyant body section, the buoyancy of said buoyant body section being greater than the weight of said hook structure and less than the weight of said non-buoyant section with the ratio of the combined weight of the hook structure and the non-buoyant section relative to the buoyancy of the buoyant body section being such that the fish lure will sink at a relatively slow controlled rate, the ratio of buoyancy to non-buoyancy of the respective elements of the fish lure selected to provide a sinking rate of approximately one foot per second, the buoyancy of said buoyant body section being substantially adequate to support the weight of the hook structure, said buoyant body section extending at rest at substantially 45° to the position of the fish lure when tensioned, and said buoyant body section in the position at rest providing an effective guard for the hook structure, whereby upon the fish lure being permitted to settle to the bottom of the water being fished or when the fish lure strikes an obstacle within the water being fished, the buoyant body section provides an effective guard for the hook structure.

2. A fish lure including a buoyant body section, a non-buoyant section disposed adjacent the leading end of said buoyant body section, a spoon-type spinner positioned contiguous to the leading end of the non-buoyant section and rotatable with respect to the longitudinal axis of the buoyant body section, a hook structure disposed at the trailing end of said buoyant body section, said spoon-type spinner including a portion of the weight of the non-buoyant section, the buoyancy of said buoyant body section being greater than the weight of said hook structure and less than the weight of said non-buoyant section with the ratio of the combined weight of the hook structure and non-buoyant section relative to the buoyancy of the buoyant body section being such that the fish lure will sink at a relatively slow controlled rate, the ratio of buoyancy to non-buoyancy of the respective elements of the fish lure selected to provide a sinking rate of approximately one foot per second, the buoyancy of said buoyant body section being substantially adequate to support the weight of the hook structure, said buoyant body section extending at rest at substantially 45° to the position of the fish lure when tensioned, and said buoyant body section in the position at rest providing an effective guard for the hook structure, whereby upon the fish lure being permitted to settle to the bottom of the water being fished or when the fish lure strikes an obstacle within the water being fished, the buoyant body section provides an effective guard for the hook structure.

3. A fish lure including a buoyant body section, a non-buoyant section disposed adjacent the leading end of said buoyant body section, a propeller-type spinner positioned contiguous to the leading end of the non-buoyant section and rotatable with respect to the longitudinal axis of the buoyant body section, said propeller-type spinner including a portion of the weight of the non-buoyant section, a hook structure disposed at the trailing end of said buoyant body section, the buoyancy of said buoyant body section being greater than the weight of said hook structure and less than the weight of said non-buoyant section with the ratio of the combined weight of the hook structure and non-buoyant section relative to the buoyancy of the buoyant body section being such that the fish lure will sink at a relatively slow controlled rate, the ratio of buoyancy to non-buoyancy of the respective elements of the fish lure selected to provide a sinking rate of approximately one foot per second, the buoyancy of said buoyant body section being substantially adequate to support the weight of the hook structure, said buoyant body section extending at rest at substantially 45° to the position of the fish lure when tensioned, and said buoyant body section in the position at rest providing an effective guard for the hook structure, whereby upon the fish lure being permitted to settle to the bottom of the water being fished or when the fish lure strikes an obstacle within the water being fished, the buoyant body section provides an effective guard for the hook structure.

4. A fish lure including a buoyant body section, a non-buoyant section disposed adjacent the leading end of said buoyant body section, said non-buoyant section including a spinner, said spinner positioned contiguous to the leading end of the buoyant body section and rotatable with respect to the buoyant body section, a wire member for operatively mounting thereon the spinner and the buoyant body section, said spinner including a portion of the weight of the non-buoyant section, a hook structure disposed at the trailing end of said buoyant body section, said wire member at its leading end including means for connecting a line thereto and at its trailing end including means for operatively connecting the hook structure thereto, the buoyancy of said buoyant body section being greater than the weight of said hook structure and less than the weight of said non-buoyant section with the ratio of the combined weight of the hook structure and non-buoyant section relative to the buoyancy of the buoyant body section being such that the fish lure will sink at a relatively slow controlled rate, the ratio of buoyancy to non-buoyancy of the respective elements of the fish lure selected to provide a sinking rate of approximately one foot per second, the buoyancy of said buoyant body section being substantially adequate to support the weight of the hook structure, said buoyant body section extending at rest at substantially 45° to the position of the fish lure when tensioned, and said buoyant body section in the position at rest providing an effective guard for the hook structure, whereby upon the fish lure being permitted to settle to the bottom of the water being fished or when the fish lure strikes an obstacle within the water being fished, the buoyant body section provides an effective guard for the hook structure.

5. A fish lure including a buoyant body section, said buoyant body section comprising a plurality of individual members providing the shape of the buoyant body section, a non-buoyant section disposed adjacent the leading end of said buoyant body section, a spinner positioned contiguous to the leading end of the non-buoyant body section and rotatable with respect to the buoyant body section, a hook structure disposed at the trailing end of said buoyant body section, a wire member for operatively mounting the plurality of individual members of the buoyant body section thereon, said wire member at its leading end including means for connecting a line thereto and at its trailing end including means for operatively connecting the hook structure thereto, the buoyancy of the plurality of individual members of the buoyant body section being greater than the weight of said hook structure and less than the weight of said non-buoyant section with the ratio of the combined weight of the hook structure and non-buoyant section relative to the buoyancy of the plurality of individual members of the buoyant body section being such that the fish lure will sink at a relatively slow controlled rate, the ratio of buoyancy to non-buoyancy of the respective elements of the fish lure selected to provide a sinking rate of approximately one foot per second, the buoyancy of the plurality of individual members of said buoyant body section being substantially adequate to support the weight of the hook structure, the plurality of individual members of said buoyant body section extending at rest at substantially 45° to the position of the fish lure when tensioned, and said plurality of individual members of said buoyant body section in the position at rest providing an effective guard for the hook structure, whereby upon the fish lure being permitted to settle to the bottom of the water being fished or when the fish lure strikes an obstacle within the water being fished, the plurality of individual members of the buoyant body section provides an effective guard for the hook structure.

6. A fish lure including a buoyant body section, a non-buoyant section disposed adjacent the leading end of said buoyant body section, a spinner positioned contiguous to the leading end of the non-buoyant section and rotatable with respect to the longitudinal axis of the buoyant body section, said spinner including a portion of the weight of the non-buoyant section, a hook structure disposed at the trailing end of said buoyant body section, the buoyancy of said buoyant body section being greater than the weight of said hook structure and less than the weight of said non-buoyant section with the ratio of the combined weight of the hook structure and the non-buoyant section relative to the buoyancy of the buoyant body section being such that the fish lure will sink at a relatively slow controlled rate, the buoyancy of said buoyant section being substantially adequate to support the weight of the hook structure, said buoyant body section extending at rest at an acute angle which is substantially less than 90° to the position of the fish lure when tensioned, and said buoyant body section in the position at rest providing an effective guard for the hook structure which will not materially interfare with the operation of the latter, whereby upon the fish lure being permitted to settle to the bottom of the water being fished or when the fish lure strikes an obstacle within the water being fished, the buoyant body section provides an effective guard for the hook structure.

References Cited by the Examiner
UNITED STATES PATENTS

| | | | |
|---|---|---|---|
| 1,758,344 | 5/1930 | Wright et al. | 43—42.17 X |
| 2,317,781 | 4/1943 | Lehto | 43—42.17 X |
| 2,651,136 | 9/1953 | Kruze | 43—44.96 X |
| 2,729,014 | 1/1956 | Johnson | 43—43.14 X |
| 2,765,572 | 10/1956 | Woolfe | 43—42.39 X |

FOREIGN PATENTS

| | | |
|---|---|---|
| 641,101 | 5/1962 | Canada. |

ABRAHAM G. STONE, *Primary Examiner.*